(12) United States Patent  
Bouatou et al.

(10) Patent No.: US 10,102,357 B2  
(45) Date of Patent: Oct. 16, 2018

(54) BIOMETRIC IDENTIFICATION AND IDENTITY DATA PROTECTION METHOD

(71) Applicant: MORPHO, Issy-les-Moulineaux (FR)

(72) Inventors: Vincent Bouatou, Issy-les-Moulineaux (FR); Jean-Christophe Fondeur, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/897,458

(22) PCT Filed: Jun. 5, 2014

(86) PCT No.: PCT/EP2014/061766  
§ 371 (c)(1),  
(2) Date: Jan. 11, 2016

(87) PCT Pub. No.: WO2014/198643  
PCT Pub. Date: Dec. 18, 2014

(65) Prior Publication Data  
US 2016/0125179 A1 May 5, 2016

(30) Foreign Application Priority Data  
Jun. 10, 2013 (FR) .................................... 13 55329

(51) Int. Cl.  
*G06F 21/32* (2013.01)  
*G07C 9/00* (2006.01)  
*G07B 15/00* (2011.01)

(52) U.S. Cl.  
CPC ......... *G06F 21/32* (2013.01); *G07C 9/00087* (2013.01); *G07C 9/00103* (2013.01);  
(Continued)

(58) Field of Classification Search  
None  
See application file for complete search history.

(56) References Cited

U.S. PATENT DOCUMENTS

2008/0098466 A1* 4/2008 Yoshida .................. G06F 21/35  
726/5  
2010/0289614 A1 11/2010 Rechner et al.  
(Continued)

FOREIGN PATENT DOCUMENTS

EP 2573730 3/2013

*Primary Examiner* — Leon-Viet Nguyen  
(74) *Attorney, Agent, or Firm* — Muncy, Geissler, Olds & Lowe, P.C.

(57) ABSTRACT

The invention relates to a method for identifying a person to be identified having a certified data medium linking a primary identifier and a primary biometric characteristic of a holder of the data medium, acquiring, during a unique operation, the first biometric characteristic on the person to be identified and a second, distinct biometric characteristic, verifying that the person to be identified corresponds to the holder of the data medium by comparing the first acquired biometric characteristic to that of the data medium, storing the second acquired biometric characteristic and associating it with a secondary identifier and during a subsequent identification, acquiring the second biometric characteristic on the person to be identified and comparing it to the second biometric characteristic.

5 Claims, 2 Drawing Sheets

(52) U.S. Cl.
CPC .......... *G07B 15/00* (2013.01); *G07C 2209/12* (2013.01); *G07C 2209/14* (2013.01)

(56) References Cited

U.S. PATENT DOCUMENTS

2013/0002399 A1* 1/2013 Frueh ................. G07C 9/00087
340/5.53
2013/0297333 A1* 11/2013 Timmons ............ G06F 19/3456
705/2

\* cited by examiner

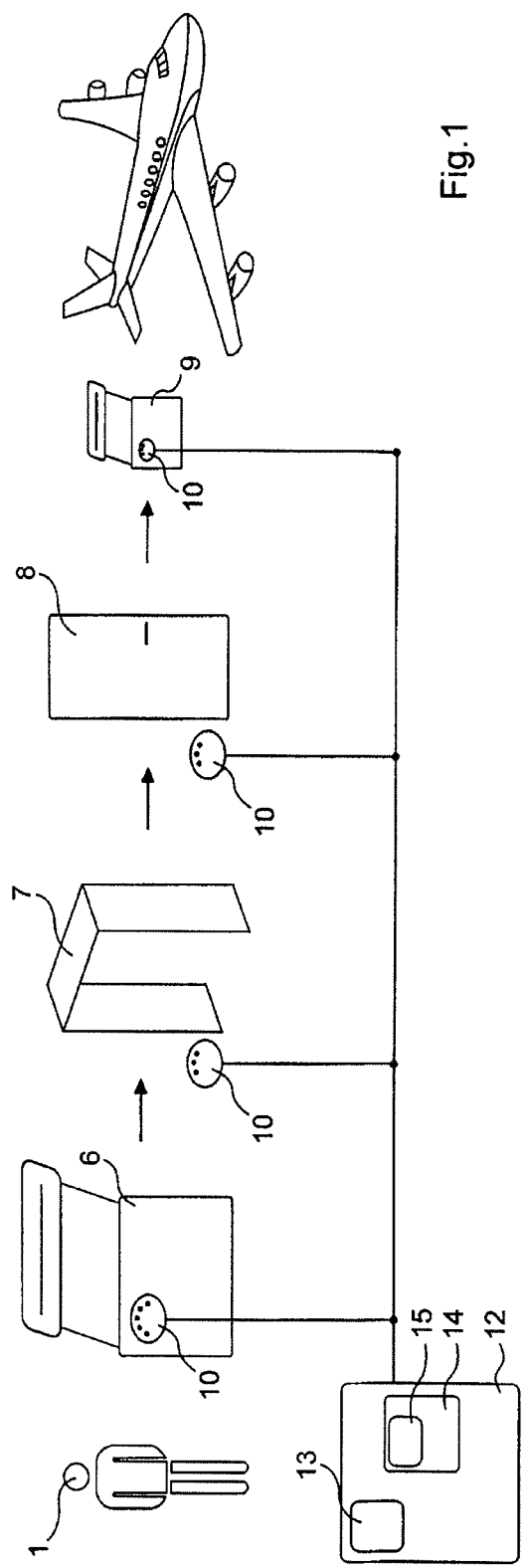
Fig. 1
Fig. 2
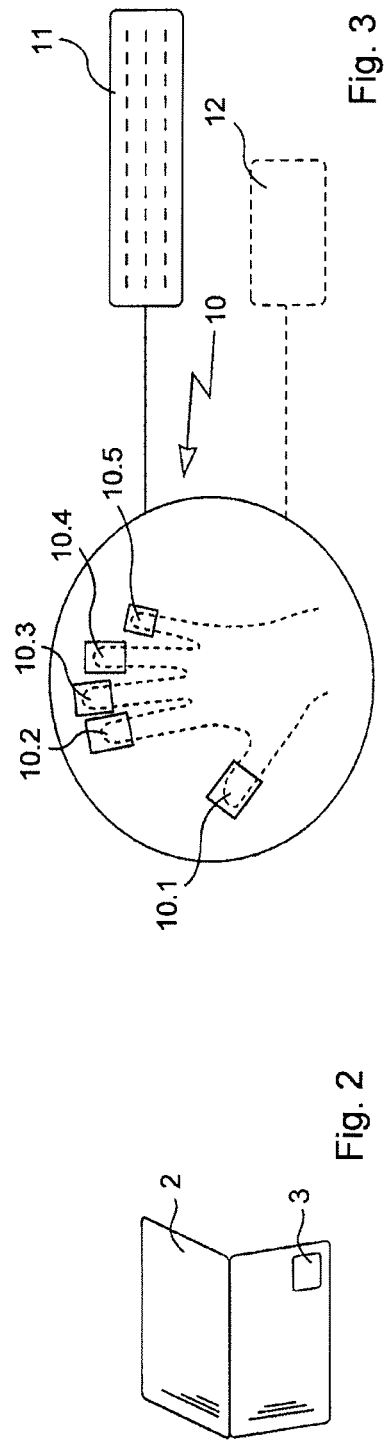
Fig. 3

BIOMETRIC IDENTIFICATION AND IDENTITY DATA PROTECTION METHOD

FIELD OF THE INVENTION

The invention relates to the field of biometrics and more particularly to a biometric identification method.

STATE OF THE ART

Methods for identifying persons by comparing biometric characteristics such as fingerprints or retina or iris images are known. Such methods require a reference biometric characteristic in relation with a person's identity information to be recorded beforehand, for each person, on a medium the access to which is regulated. This operation is usually called enlistment. Subsequently, during a person's identification process, an acquisition of a biometric characteristic assumed to match the reference biometric characteristic is carried out on the person to be identified, and the acquired biometric characteristic is compared with the reference characteristic. Some official documents, such as so-called "biometric" passports, contain a secured chip wherein the holder's civil status and two of his/her fingerprints are recorded. Such fingerprints are acquired upon the creation of the passport by a public officer, after the person's identity has been checked. They are then stored on the passport secured chip. The fingerprints may be stored in a storage computer server that combines these with the person's complete identity. Such a method enables a quick and secure checking of a person's identity by acquiring two biometric characteristics-here the fingerprints of the indexes- and comparing with the record in the secured chip of the passport and/or the storage server. Private applications, such as an authentication prior to a payment or to entering a controlled access area are known, wherein one of the two biometric characteristic is acquired to be compared with a biometric characteristic stored elsewhere. The acquisition potentially enables a person having access to the storage computer server to link said biometric characteristic and the person's civil status using such biometric identification method and thus to track said person while disregarding the principles of respect of privacy and free movement of people.

Let us examine, for example, an airport security protocol comprising several compulsory check-points. It is important to make sure that a traveler did go through all the steps of the protocol before allowing his/her access to the plane. As the traveler's identity is checked using biometric acquisition in the first step of the protocol, i.e. upon his/her checking-in, the subsequent biometric acquisitions only aim at tracking the traveler throughout the security protocol. However, the security personnel or the airport operators need not have access to the traveler's identity.

To achieve such a result, creating a database associating the identification biometric characteristic with a limited quantity of information relating to the traveler, for instance his/her ticket number could have been considered. However, upon each identity checking, the acquired biometric characteristic makes it possible, in theory, to have access to all data relating to the traveler's identity, which raises problems as regards the respect of privacy, specifically, as regards the possibility that police services might cross-check files. This lack of privacy is an obstacle to the development of biometric identification which is otherwise an economical, easy, fast identification solution with a high level of reliability (forgery is difficult).

OBJECT OF THE INVENTION

An object of the invention is to provide a method for identifying a person making it possible to protect all or part of the data relating to his/her identity.

SUMMARY OF THE INVENTION

For this purpose, according to the invention, a method for identifying a person having a certified data medium linking a primary identifier and a first biometric characteristic of a holder of the data medium is provided, which comprises the steps of:
acquiring, during a unique operation, the first biometric characteristic on the person to be identified and a second, distinct biometric characteristic;
verifying that the person to be identified corresponds to the holder of the data medium by comparing the first acquired biometric characteristic to that of the data medium;
storing the second acquired biometric characteristic and associating it with a secondary identifier;
during a subsequent identification, acquiring the second biometric characteristic on the person to be identified and comparing it to the second biometric characteristic.

Biometric characteristic here means a set of distinctive data obtained from an (optical, electrical . . . ) image, in its broadest sense, of a part of a person's body. Thus, as the second biometric characteristic is different from the first biometric characteristic stored in the certified data medium and the secondary identifier is different from the primary identifier, the primary identifier cannot be found using the second biometric characteristic and the secondary identifier.

The biometric characteristics acquired are advantageously selected from the following ones: fingerprint, vein, face, iris, skin texture, peri-ocular venous pattern, skin folds.

This makes it possible to use standard acquisition devices relating to biometric characteristics, the detection of which uses proven techniques and the uniqueness of which is recognized, which contributes to the reliability of the identification and enables an economical implementation of the method.

Other characteristics and advantages of the invention will become apparent from reading the following description of a particular non-restrictive embodiment of the invention.

BRIEF DESCRIPTION OF THE FIGURES

Reference will now be made to the appended drawings, wherein:
FIG. 1 is a schematic view of the method according to the invention applied to an airport security protocol;
FIG. 2 is a schematic view of a biometric passport;
FIG. 3 is a detailed view of a fingerprint acquisition apparatus.

DETAILED DESCRIPTION OF THE INVENTION

Figure 4:
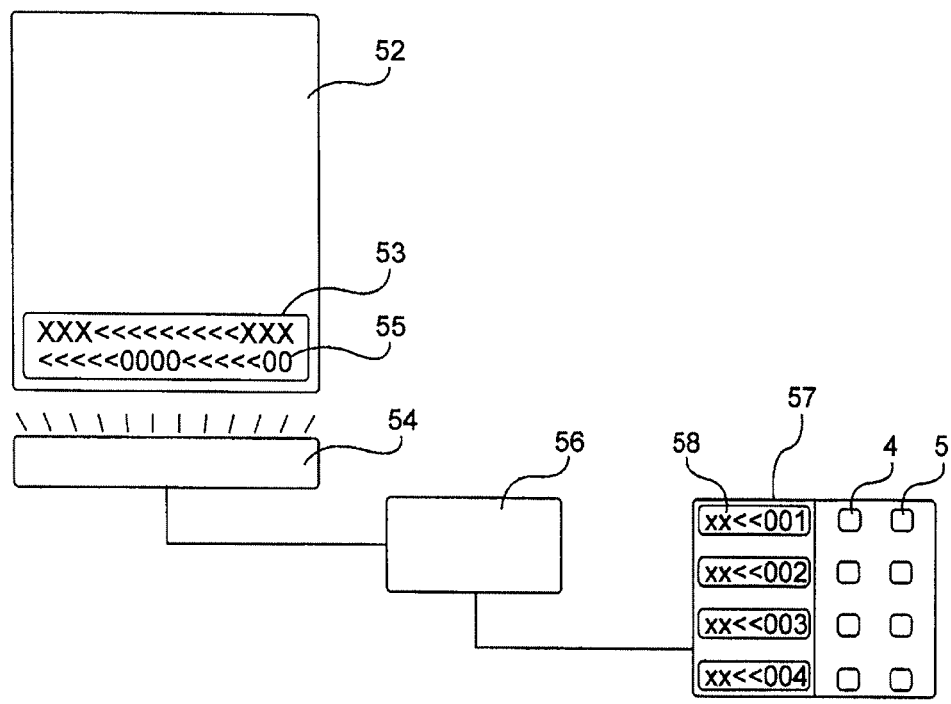
FIG. 4 is a schematic view of a second embodiment of the method according to FIG. 1.

Referring to FIGS. 1 to 3, the method according to the invention is implemented in an airport for tracking a traveler, generally designated 1, who holds a biometric passport 2 integrating a secured chip 3 wherein certified records of his/her fingerprints 4 and 5, respectively of the index and middle finger of the traveler's right hand, as well as his/her civil status in full and his/her address, among others, are stored. The airport is provided with a plurality of successive check-points among which:
- a check-in desk 6;
- a luggage check-point 7;
- an access point 8 to the boarding area;
- a plane boarding desk 9.

Each check-point 6-9 is provided with biometric characteristic acquisition means, here a fingerprint scanner 10 provided with five acquisition pads 10.1, 10.2, 10.3, 10.4 and 10.5 respectively for the thumb, index, middle finger, ring finger and little finger prints of the traveler's right hand 1. Each fingerprint scanner 10 comprises a remote display screen 11 and is connected to data processing computer means comprising a server 12 comprising at least one microprocessor 13 and storage means, here a memory 14.

When arriving at the check-in desk 6, the traveler 1 shows his/her ticket, his/her biometric passport 2 and places his/her right hand on the fingerprint scanner 10. The check-in officer launches, in a single operation, the acquisitions 11.1, 11.2, 11.3, 11.4 and 11.5 of the traveler's 1 fingerprints with the fingers being respectively placed on the acquisition pads 10.1 to 10.5 of the fingerprint scanner 10. The biometric passport 2 is, in turn, placed on a specific reader that provides access to information contained in the secured chip 3, specifically the certified records 4 and 5 of the traveler's 1 right hand index and middle finger prints. The acquisitions 11.2 and 11.3 corresponding to the traveler's index and middle fingers prints are then compared with the certified records 4 and 5 contained in the secured chip 3 of the biometric passport 2. This comparison is preferably executed within the secured chip 3, with the captured biometric characteristics being so transmitted to the secured chip 3 that the certified records 4 and 5 will not leave the secured chip 3. Upon completion of the comparison, the secured chip 3 transmits a piece of information indicating whether the biometrics characteristics are identical with or different from the certified records 4 and 5. If the acquisitions 11.2 and 11.3 match the records 4 and 5, the traveler 1 is identified as the passport holder and his/her civil status is confirmed. The server 12 then stores in a catalogue 15 of second biometric characteristics, the acquisitions 11.1, 11.4 and 11.5 corresponding to the traveler's 1 thumb, ring finger and little finger prints and then associates therewith a secondary identifier 16, here the traveler's flight number 1 together with his/her seat number on the plane, for example: AF 001-21B. It should be noted that the acquisitions 11.2 and 11.3 of the traveler's 1 index and middle finger prints are not saved in the server 12.

When checking in his/her luggage 7, the traveler 1 applies his/her right hand onto a fingerprint scanner, the acquisition pads 10.1, 10.4 and 10.5 of which only are active. The acquisitions of the thumb, ring finger and little finger prints are sent to the server 12 which, after comparison, matches the acquired fingerprints and the acquisitions 11.1, 11.4 and 11.5 saved in the catalogue 15 and returns a message indicating the traveler's 1 secondary identifier 16, i.e. his/her flight number and seat on the plane to the remote display screen 11, to the attention of the security officer in charge of the check-point 7. The security officer then knows that the traveler 1 has regularly checked-in on one of the departing flights and the server 12 records that the traveler 1 has checked in his/her luggage. The traveler's 1 identification at the access point 8 to the boarding area takes place in the same manner and the server 1 records that the traveler has crossed the access point 8 to the boarding area. Thus, when checking in at the plane boarding desk 9, the traveler 1 identifies again as per his/her secondary identifier by scanning his/her thumb, his/her ring finger and his/her little finger prints. The server 12 confirms that the person whose thumb, ring finger and little finger prints have just been read is the traveler 1, that he/she actually went through all the check-points prior to the flight and that he/she can therefore enter the plane. The traveler's 1 identity has never been saved in the server 12 or disclosed during the checking operations and the biometric characteristic by which he/she has been identified at each check-point does not make it possible to know his/her civil status, even if the server 12 is accessed to.

The traveler 1 has thus been identified for certain by comparing a first acquired biometric characteristic (acquisitions 11.2 and 11.3 of the right hand index and middle finger prints) with a record of same first characteristic input in a certified data medium linking the traveler's 1 civil status and the first biometric characteristic, i.e. the biometric passport 2. The traveler 1 also has a secondary identifier, unrelated to his/her civil status, associated with a second biometric characteristic different from the one required for establishing his/her civil status, i.e. the fingerprints of his/her thumb, his/her ring finger and his/her little finger. The traveler can therefore be singled out (by his/her secondary identifier) without his/her civil status being revealed or determined. The method of the invention thus allows a quick and automated identification respectful of privacy while ensuring a high level of reliability.

The elements identical with those previously described will bear reference numerals identical therewith in the following description of a second embodiment.

Referring to FIG. 4, the certified data medium is, here, a passport 52 with no microchip and comprising at least one data field. This data field is here a coded area 53 which can be read by a machine, also called MRZ (for "Machine Readable Zone"). Prior to his/her trip, the traveler 1 registered with a biometric characteristic database 57 wherein the data 55 of the coded area 53 is associated with certified records of the prints 4 and 5 of the index and middle finger of his/her right hand. When checking in 6, the traveler 1 shows his/her passport 52 and applies his/her right hand onto the fingerprint reader 10. The check-in officer then shows a suitable reader 54 the MRZ coded area 53. The scanner 54 reads the data 55 of the area 53. It is connected to a processing unit 56 which queries in a manner known per se, the biometric characteristic data base 57 associating MRZ area data and certified records of biometric characteristics. The processing unit 56 identifies the field 58 of the database 57 containing the information 55 and then uses the certified records 4 and 5 of the traveler's right hand prints of his/her index and middle finger associated with the field 58 to make a comparison with the acquisitions 11.2 and 11.3. If the acquisitions 11.2 and 11.3 match the records 4 and 5, the traveler 1 is identified as the passport holder and his/her civil status is confirmed. The server 12 then stores in the second biometric characteristics catalogue 15 the acquisitions 11.1, 11.4 and 11.5 corresponding to the prints of the traveler's 1 thumb, ring finger and little finger and then associates therewith a secondary identifier 16. The other operations of the identification method are identical with the one described above.

An identification method is thus provided, wherein the link between the primary identifier of the data medium (the passport 52) and the first biometric characteristic (the certified records 4 and 5) is established by the association of a data field 53 of the certified data medium 52 with a corresponding field of the biometric characteristic database 57.

This second embodiment makes it possible to use biometric identification even though the traveler 1 is provided with a data medium with no biometric characteristics storage means.

Of course, the invention is not limited to the described embodiments but encompasses any alternative solution within the scope of the invention.

More particularly,

- although the secondary identifier of the person to be identified here is the traveler's 1 flight number together with his/her seat number on the plane, the method of the invention is also applicable to other types of secondary identifiers such as an avatar in a virtual world, an encrypted bank identifier, a sports club license number, a random number etc.
- although the certified data medium is here a biometric passport, the method of the invention is also applicable to other types of certified data media such as access cards to a sports club, an identity document, a bank card, etc.;
- although the first biometric characteristic here matches the fingerprints of the index and middle fingers of the right hand of the person to be identified and the second biometric characteristic matches the fingerprints of the thumb, ring finger and little finger of the right hand, the method of the invention also applies to other biometric characteristics such as, for instance, the indexes of both right and left hands as the first biometric characteristic and the thumbs of both hands as the second biometric characteristic. The first biometric characteristic may also match the iris image of an eye and the second biometric characteristic may be the peri-ocular venous pattern of the same eye or the other eye;
- although the second biometric characteristic here matches the fingerprints of the thumb, the ring finger and the little finger of the right hand, the invention also applies to a second biometric characteristic comprising only one or more fingerprint(s).

The invention claimed is:

1. A method for identifying a person to be identified having a certified data medium linking a primary identifier comprising civil status and/or his/her address and a first biometric characteristic of a holder of the certified data medium, the person having to be identified at a plurality of successive check points comprising a first check point and a second check point, the method comprising the following steps:

- acquiring, during a unique operation at the first check point, the first biometric characteristic on the person to be identified and a second, distinct biometric characteristic;
- verifying that the person to be identified corresponds to the holder of the certified data medium by comparing the first acquired biometric characteristic on the person to be identified to the first biometric characteristic of the certified data medium;
- if confirmed, storing in a first server the second acquired biometric characteristic and associating it with a secondary identifier;
- during a subsequent identification at the second check point, acquiring the second biometric characteristic on the person to be identified and comparing the second biometric characteristic that is currently acquired to the stored second biometric characteristic; and
- in case the subsequent identification is positive, recording in the first server that the person to be identified has passed the subsequent identification at the second checkpoint;
- verifying in the first server that the person to be identified has passed all identifications at previous checkpoint, wherein the second biometric characteristic is stored, along with the associated secondary identifier, in the first server and the first biometric characteristic is stored in a second server that is different from the first server,
- the second server containing either the first biometric characteristic or the primary identifier comprising civil status and/or his/her address.

2. The method according to claim 1, wherein the acquired biometric characteristics are selected from the following ones: fingerprint, vein, face, iris, skin texture, peri-ocular venous pattern, skin folds.

3. The method according to claim 1, wherein the certified data medium is an identity document comprising an electronic chip or a Machine Readable Zone including biometric characteristics.

4. The method according to claim 3, wherein the certified medium is a passport.

5. The method according to claim 1, wherein the link between the primary identifier of the certified data medium and the first biometric characteristic is established by an association of a field of data in the certified data medium with a corresponding field of a biometric characteristic database.

* * * * *